Figure 1:
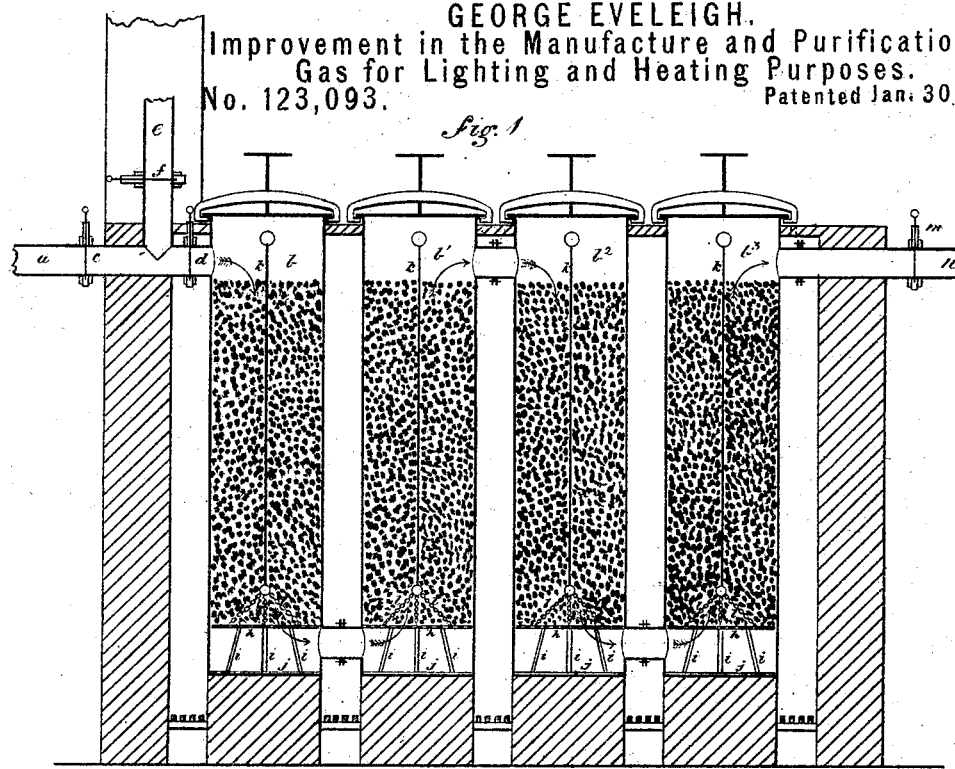

4 Sheets--Sheet 1.

GEORGE EVELEIGH.
Improvement in the Manufacture and Purification of
Gas for Lighting and Heating Purposes.
No. 123,093. Patented Jan. 30, 1872.

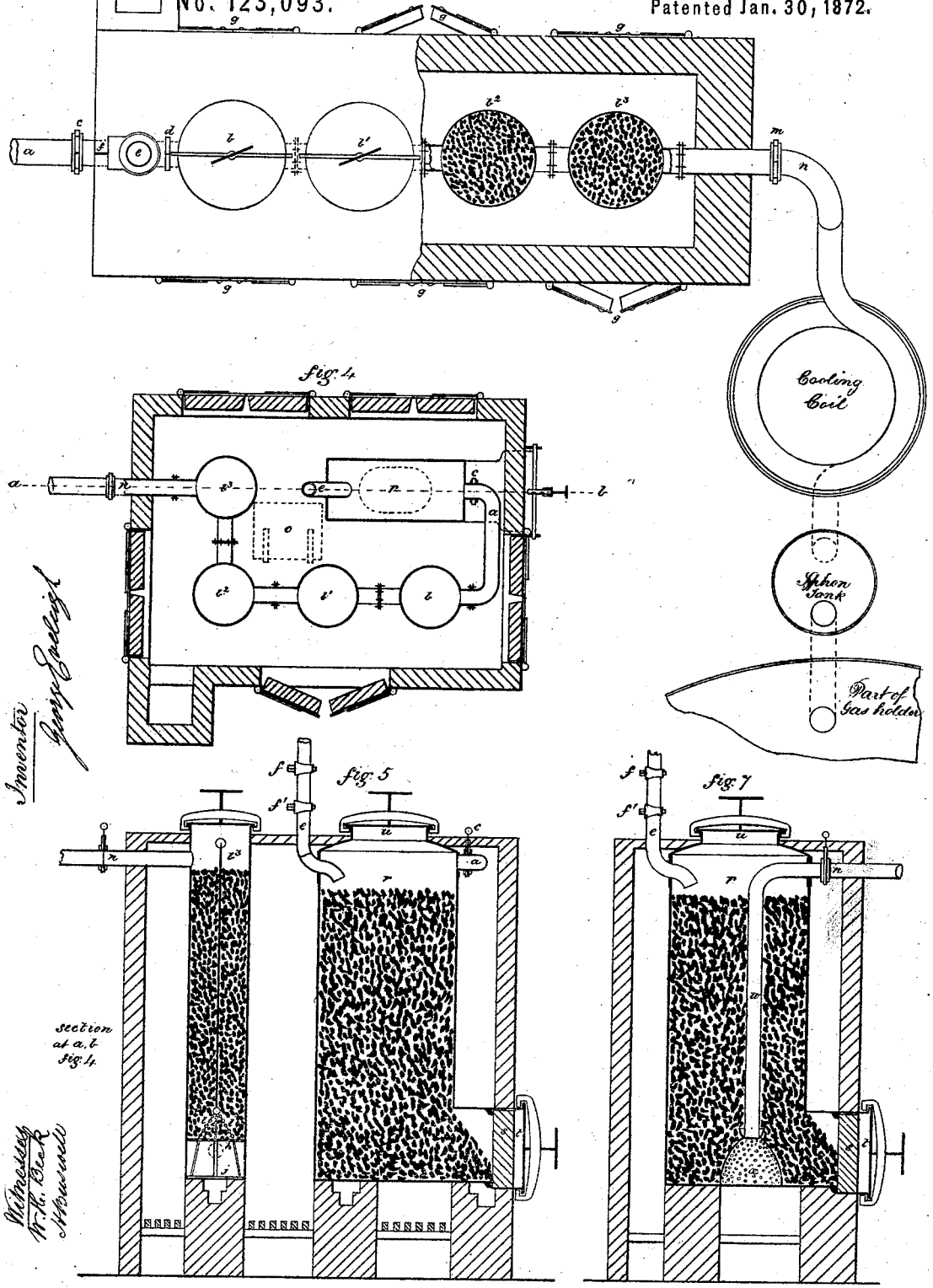

GEORGE EVELEIGH.
No. 123,093.
4 Sheets--Sheet 3.
Patented Jan. 30, 1872.
Improvement in the Manufacture and Purification of Gas for Lighting and Heating Purposes.
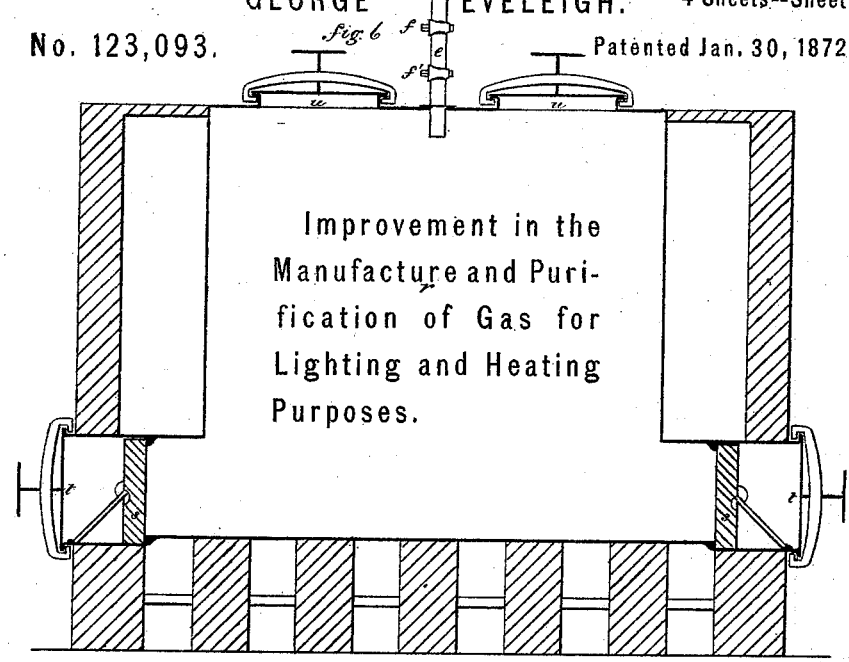
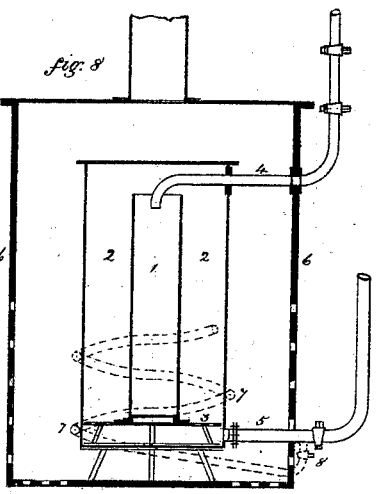
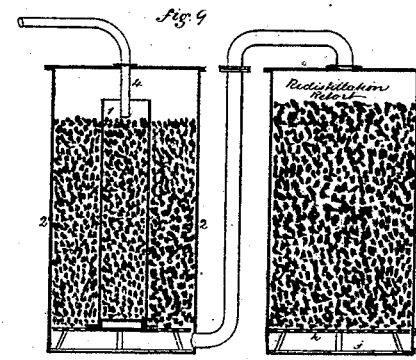
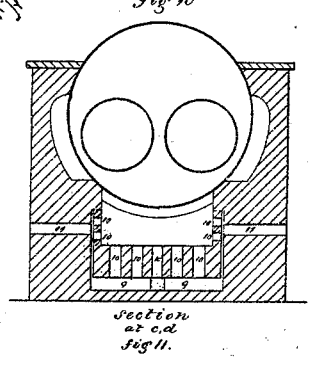
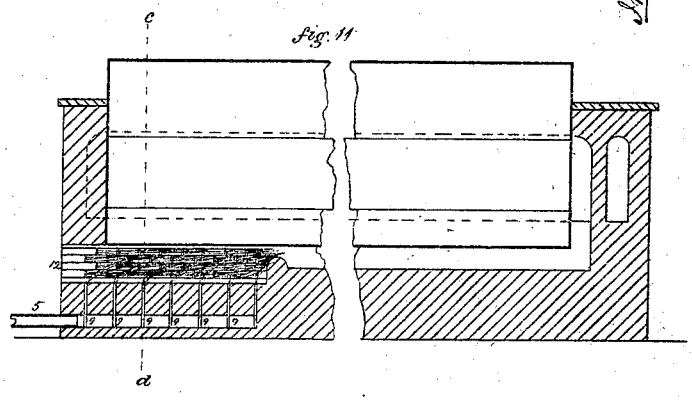

GEORGE EVELEIGH.
Improvement in the Manufacture and Purification of
Gas for Lighting and Heating Purposes.
No. 123,093. Patented Jan. 30, 1872.
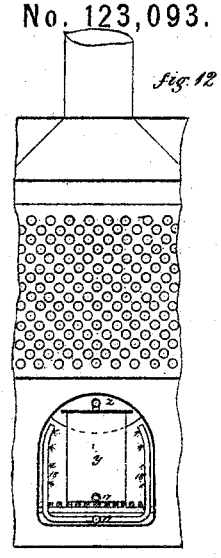
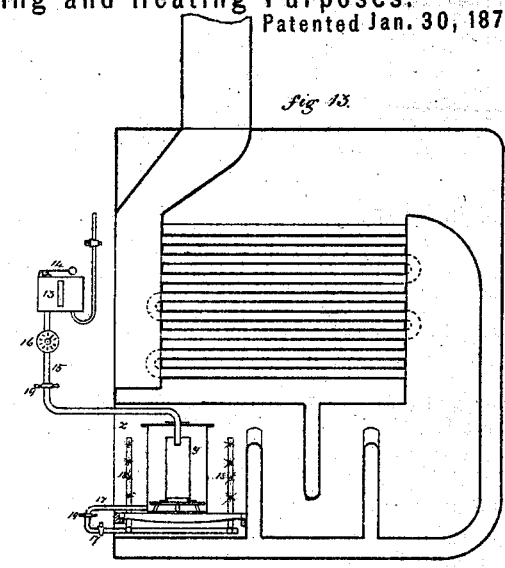
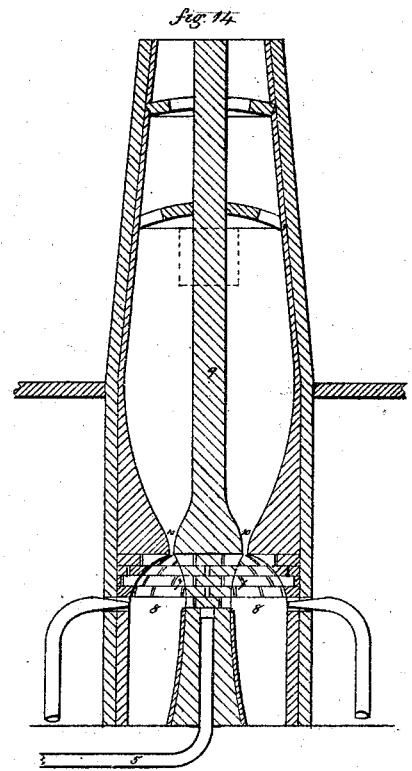
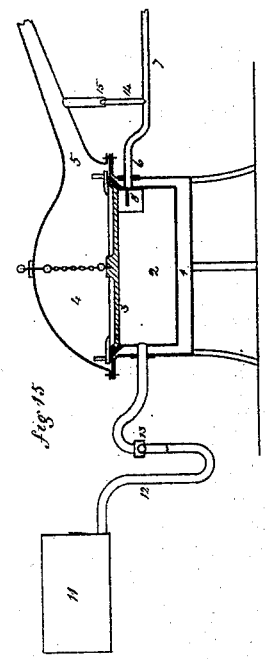
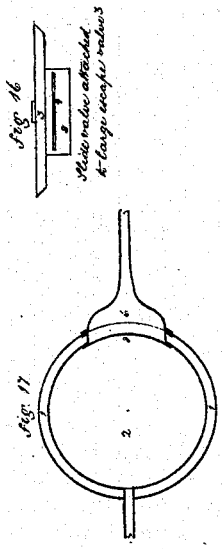
Witnesses
W. H. Beck
N. Burwell
Inventor
George Eveleigh

123,093

UNITED STATES PATENT OFFICE.

GEORGE EVELEIGH, OF LONDON, GREAT BRITAIN, ASSIGNOR TO JOSEPH G. EASTLAND, OF SAN FRANCISCO, CALIFORNIA.

IMPROVEMENT IN THE MANUFACTURE AND PURIFICATION OF GAS FOR LIGHTING AND HEATING PURPOSES.

Specification forming part of Letters Patent No. 123,093, dated January 30, 1872.

*To all whom it may concern:*

Be it known that I, GEORGE EVELEIGH, of 15 George street, Mansion House, in the city of London and Kingdom of Great Britain, have invented certain "Improvements in the Manufacture and Purification of Gas for Lighting, and in the means of applying the same to heating purposes, parts of which improvements are also applicable to the purification of mineral oil," for which said invention Letters Patent for the United Kingdom of Great Britain and Ireland have been granted unto me, bearing date the 7th day of January, Anno Domini 1869, and numbered 45; and I do hereby declare that the following is a full and exact description thereof, reference being had to the accompanying drawings and to the letters of reference marked thereon.

My invention relates to the manufacture of gas for lighting purposes from coal, shale, wood, bitumen, petroleum, or other substances containing carbon, hydrogen, or nitrogen in their chemical composition, and to the purification thereof; also, to certain means of producing gas from such liquefiable substances for and applying it, or impure gas otherwise obtained from the substances above mentioned, to the purpose of generating heat in furnaces or in other situations where heat is required; and to the purification of mineral oil for the purpose of rendering it non-explosive below a temperature of 300° Fahrenheit. The improvements in the manufacture and purification of the gas obtained from the substances referred to consist in the application of certain means for the distillation or redistillation thereof, and the reduction during that distillation or redistillation of all or any of the waste products ordinarily produced in the distillation of such gas from those substances, so as to convert the whole, or nearly the whole, of such distilled waste products into an increased quantity and improved quality of gas for lighting or heating purposes.

I effect the above improvements by passing the gas, as soon as produced from the substances, through upright tubes, cylinders, or chambers, which, for convenience, I call "redistillation-retorts," and of which one or more may be employed, of dimensions suitable to the quantity of gas to be produced and the extent of purification required. These "redistillation-retorts" are loosely filled with any one or more, as may be required, of the following or any other substances which will produce similar effects—namely, charcoal, coke, chalk, lime, bones, limestone, filings, turnings, or pieces of iron or other metal, or scorious metal not charged with sulphur, or of metals somewhat oxidized, which substances, I shall, for convenience, call "chemical purifiers." The "redistillation-retorts," if more than one are employed, are then connected together and to the gas-generating retorts by suitable pipes, so as to allow the gas, as produced, to pass through them and among the "chemical purifiers" contained therein. They are placed in a suitable furnace and raised to a more or less red heat, according to the nature of the gas or the substance from which it is produced and the extent of purification required. The gases and waste products, in passing through the heated "chemical purifiers" in the "redistillation-retorts," will undergo the necessary chemical changes to produce gas of the required quality and purity, and will leave little or no residue. The quantity of gas resulting will be much increased, while the sulphur will be united to the metallic substances or calcareous earths contained in the "redistillation-retorts," and can thus be removed in a dry and inoffensive state when needful. The purified gas may then be cooled by passing through pipes exposed to any ordinary cooling influence. It may then go at once to the gas-holder for use.

The improvements in the means of producing gas from any such liquefiable substances as before referred to, and applying it or the impure gas from said substances to the purposes of generating heat in furnaces, consist in allowing the said liquefied substances or impure gas to flow into a cylinder or other vessel filled with heated charcoal or coke mixed, if needful, with any of the other "chemical purifiers" above mentioned, which cylinder is provided with suitable orifices, openings, or burners for the escape of the gas, and is placed in the opening for the furnace or other place where the heat is required.

By the employment of one modification of this process I am enabled to purify mineral oil, so as to make it non-explosive below 300° Fahrenheit, with greater certainty than has been effected heretofore, by distilling it in a sand-bath, through charcoal or certain other of the "chemical purifiers" before mentioned, at a heat of about 325°, or just above its boiling point.

When distilling gas from coal or other substances in the ordinary retorts I employ the following arrangement of apparatus for the purpose of purifying such gas and producing other gas from oil or other similar liquefiable substances: Each ascension-pipe passing from a retort is to be provided with a stop-valve, by means of which the connection can be cut off from the retort while the latter is being cleared or charged. I connect a number of such ascension-pipes with a main pipe leading to a set of "redistillation-retorts," (see Figs. 1, 2, and 3 of the drawings hereto annexed,) wherein $a$ represents the main pipe leading from the retorts connected near the upper end of first "redistillation-retort" $b$. $c$ and $d$ are two valves fitted into the said main pipe $a$. $e$ is another pipe leading from a reservoir of creosote, oil, petroleum, or other such liquefiable substances. $f$ is a valve, by which the influx of such substances into the space between the valves $c$ and $d$ can be regulated at pleasure. The "redistillation-retorts" $b$, $b^1$, $b^2$, &c., are placed in a brick or other furnace, and supported on brick-work, in the manner shown. The furnace is provided with upper and lower sets of doors $g$ $g$ $g$ on either side and a chimney in any convenient position. The "redistillation-retorts" may be placed in a row or in any other convenient position. I prefer to employ them about eight feet high by two feet diameter for a main supply-pipe of from six inches to nine inches diameter. They may be of wrought or cast iron or clay, and are connected together by short necks, in the manner shown. These junctions must be made quite secure from leakage. The bottoms of the "redistillation-retorts" are closed, and the tops made to open with any ordinary mouth-piece arrangement projecting above the furnace top. In each "redistillation-retort" is a loose perforated false bottom, $h$, just above the opening near the bottom of each "redistillation-retort." The false bottom is connected by legs $i$ $i$ $i$ to a flat iron plate, $j$, resting on the bottom of the "redistillation-retort." It allows the gas to pass freely through, but restrains the "chemical purifiers" above it, while the flat plate $j$ receives the ashes as formed. The false bottoms and plates are raised or lowered in clearing and charging the "redistillation-retorts" by means of rod $k$ and chains $l$ $l$ $l$ fastened to them. The "redistillation-retorts" may be heated by an ordinary furnace; but I prefer to heat them by first lighting a fire from the lower doors, and then filling up the whole space surrounding the redistillation-retort, and between them and the sides of the furnace, with coke, to within about nine inches of the top, by means of the doors above referred to or from others at the top of the furnace, movable bars being employed inside the doors to retain the fuel when opening them. I then regulate the heat by opening or closing any or all of the said doors, as may be required to keep the "redistillation-retorts" at a red heat only—say 700° Fahrenheit. The ash-pits should be fitted with dampers to check the draught as needful. These "redistillation-retorts" may be heated by gas in jets, in the manner I shall hereafter more particularly describe.

Before using the "redistillation-retorts" they are to be charged with charcoal in small lumps, mixed with about one-third its weight of small pieces of chalk, lime, or other alkali, not too finely broken, as it would prevent the proper filtration of the gas. When they are nearly full a layer of coarse iron filings or turnings is laid over the top of the "chemical purifiers," about one or two inches thick; or these substances may be charged in alternate layers. The proportions may, however, be varied, according to the chemical nature of the substances from which the gas is to be produced. When the "redistillation-retorts" are thus filled from the false bottom to the lower edge of the connecting-opening or pipe at the top, the covers are screwed firmly on, and the fire of the furnace lighted and kept to the required heat. Most of the oils require only 600° Fahrenheit, but for coal-gas about 700° Fahrenheit will be required; and if any pitchy substance is forming an increased heat is required. This, however, can seldom occur if sufficient lime or chalk be used. Until the "redistillation-retorts" have attained the required heat the vapors from the chalk and charcoal may be allowed to escape by leaving the lid of the last one partly open, the valves $c$ and $d$ in main inlet-pipe, and that, $m$, in outlet-pipe $n$, being closed. When thus prepared the last lid can be closed and the valves above mentioned opened. The gas will then flow through from the retorts, which are not to be charged until the "redistillation-retorts" are ready. When the flow of gas from the retort slackens sufficiently the oil or other fluid substance may be gradually introduced into the first "redistillation-retort," and during the recharging of the ordinary retorts a larger quantity thereof can be introduced. The oil or other liquid is soon vaporized in the "redistillation-retorts," and the impure gas coming from the retorts being in a state of vapor, both of these are forced onward by their own pressure *a tergo*—first down, then up, down, and up, &c.—through the whole series of "redistillation-retorts;" or they may be drawn by exhaustion in a manner well known. The following changes then take place. Bicarbureted and carbureted hydrogen are separated from the gas and vapors passing over from the retort and produced from the oil. The other parts, such as ammonia, carbonic acid, pitch-vapor, water, creosote, naphthaline, and the like, are decomposed by the "chemical purifiers" in the "redistillation-retorts," the result being the production of more bicarbureted and carbureted hydrogen, carbonic oxide, cyanogen, and free hydrogen, which pass forward together, forming a good available lighting-gas.

The sulphureted hydrogen contained in the gas from the retorts is decomposed by the iron filings, and also by the lime, with which the sulphur combines, forming a sulphuret. The hydrogen combines with carbon, forming a further portion of carbureted hydrogen, which goes over with the other products, as above explained.

In the commmon process of gas-making the peroxide of iron has been used for abstracting the sulphur; but as it contains two proportions of oxygen to one of metal the former take up four proportions of hydrogen from the gas, water being formed. By my process the sulphur combines with the base, forming a dry sulphuret, and the hydrogen, which would be lost in the common process, combines with carbon in the "redistillation-retort," and is utilized, as above explained.

Figure 2:
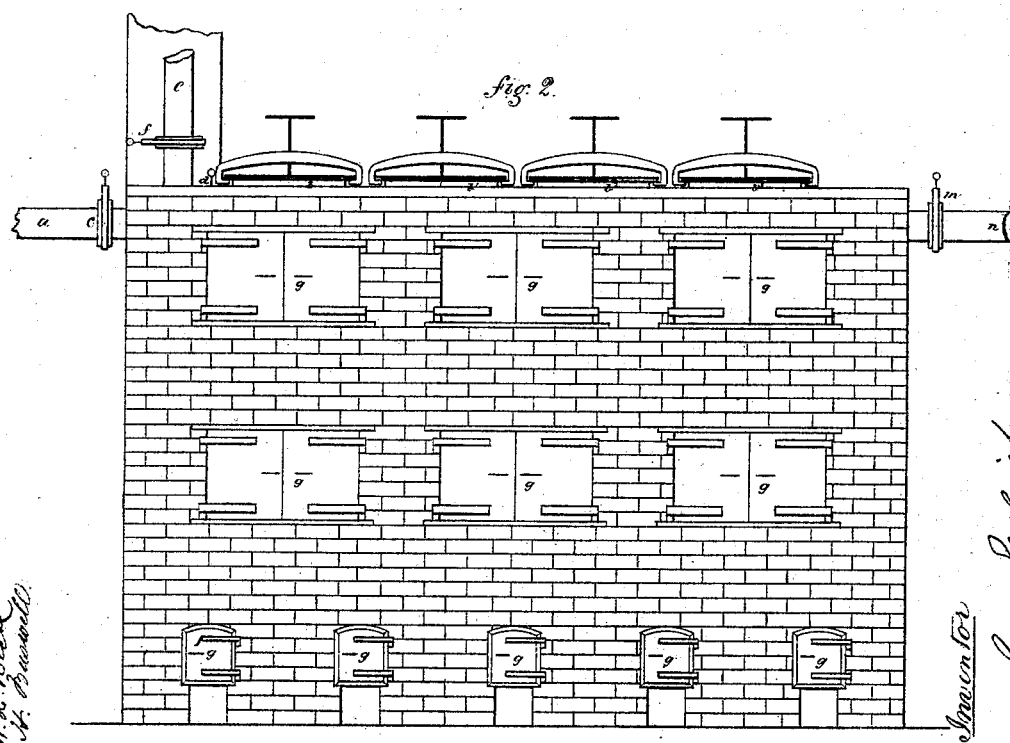

The gas, passing onward in the direction of the arrows in Fig. 1, becomes purified by the time it has reached the outlet-pipe $n$ at the end of the series of retorts. From thence it may be passed direct to a condenser or cooling apparatus of any ordinary construction; but I prefer a coil of pipe in a tank of running water, as used in ordinary spirit distillation. It thence passes through a siphon-tank, in which, not thoroughly purified, it will leave a deposit, and the extent and nature or non-existence of any deposit will show whether there is any defect or not in regard to the "redistillation-retorts," furnaces, or other means employed in its manufacture. From the siphon the gas goes into the gas-holder for use.

If preferred, this apparatus may be used for the purification of coal-gas alone without the use of oil or other liquefiable substances, as described.

It is important that the "redistillation-retorts" should be placed in a vertical position, as otherwise the gases and vapors would form a channel in the "chemical purifiers" at the upper side of the retort, and would pass on unchanged. It is also important to make these retorts of sufficient length, especially when dealing with impure coal products, as if they are too short the effect will be imperfect.

The apparatus above described is what I employ when using ordinary retorts for distilling the gas; but I also employ an improved retort, which can not only be used as a distilling-retort, but also as a purifying-chamber or "redistillation-retort." Figs. 4 and 5 show the arrangement when using this retort. $r$ represents the retort, which may conveniently be made six feet high, twenty-eight inches long, and twelve inches wide. In the lower part is an opening closed with a fire-brick or tile, $s$, and the usual retort-door or lid $t$. This opening is for the purpose of clearing the retort. It is to be firmly closed before filling. $u$ is the lid of the retort, turning on a pivot to one side, so that it can be instantly closed when the charge is in and screwed down firmly. A tube, $e$, enters the retort near the top. It is provided with two cocks, $f f'$, for the purpose of introducing the oil or other liquids for the purpose of making gas in the same manner as already described with respect to Fig. 1. $a$ is an outlet-pipe of about three inches diameter, with valve $c$ leading to the first of a series of "redistillation-retorts," $b$, $b^1$, $b^2$, &c., set in the same furnace and of precisely similar structure to those above described, but, as proportioned to the size of retort described, are only about six feet high by twelve inches diameter. $n$ is the outlet-pipe and valve leading to condensing-coil. The retort and "redistillation-retorts" are set in the same furnace, which may be of similar structure to that shown in Figs. 1, 2, and 3, and provided with a door, $o$, at top, for convenience of charging fuel into the center of furnace.

Fig. 6 shows a similar retort, with two openings at bottom for clearing and two at top for charging; but they may be constructed of a size proportioned to the quantity of material to be operated upon at once, care being taken that they shall be of sufficient height, the "redistillation-retorts" employed in connection with it being proportioned thereto similarly to those used with the retort shown in Figs. 4 and 5. To charge these retorts I reduce the coal to a coarse powder and mix it with one-fourth or one-fifth of its weight of resinous pine or fir sawdust, or other light well-dried material suitable for producing gas. To this mixture I add chalk equal to one-fortieth of the weight of coal, or lime equal to one-eightieth thereof. The retort may be charged by a hopper or hoppers fitting over the mouth or mouths of the retort, and provided with a slide or slide-doors, which, being withdrawn, allows the fuel charged into the hopper to fall into the retort. (The hoppers may be first filled and then brought by a tram-rail over the mouths of the retorts, if preferred.) The lid of the retort is immediately closed and screwed down, and the valve in communication with the "redistillation-retorts" opened at same time.

The sawdust yields nearly four-fifths of its weight in gas, its acetic acid, tar-water, ammonia, and carbonic acid, as also the similar substances resulting from the distillation of the coal being all decomposed by the action of the "chemical purifiers" in the "redistillation-retorts," in the same manner as before explained. The sawdust, besides yielding gas, has also the effect of deadening the fall of the coal, and the retort is not so liable to injury as it would be if lumps of coal alone were allowed to fall into it. By the employment of this kind of retort, and the mode of charging above explained, the gas is much more quickly disengaged, and at a lower temperature, whereby it escapes the attenuating influence to which the bicarbureted hydrogen is subject at high temperatures. When the first force of the gas is exhausted the oil or other liquid can be admitted by the valves $f\,f'$ in pipe $e$ as long as may be required, or until shortly before the time for withdrawing the charge, which is done principally through the lower opening, the valve $c$ being at that time closed to prevent regurgitation of the gas. A retort of this description, proportioned to contain three tons, will be distilled off in about three hours, and will be opened only once for the whole operation. Ordinary retorts filled with the scoop would have to be opened, say, twenty times in distilling the same quantity, and a large quantity of air thus admitted, which causes very much water and ammonia to be formed—a result which does not take place with this kind of retort.

Fig. 7 shows how the same kind of retort may be used for obtaining gas from oil or other similar liquid substances, and at the same time may be made to act as a "redistillation-retort." $r$ represents the retort; $e$, the inlet-pipe for the oil or other liquefiable material for making gas; $n$, the outlet-pipe and valve; $w$, a pipe joined to outlet-pipe, and, passing down inside the retort, is terminated by a perforated false bottom or cage, $x$. The retort is charged with charcoal or other "chemical purifiers," as for a single "redistillation-retort," and, being heated in a furnace in a similar manner, the oil or other such liquid is introduced by the pipe $e$. The vapor of the oil descends through the charcoal or other "chemical purifiers," and, being thereby converted into purified gas, passes through the false bottom, escaping by the pipe $w$ into the outlet-pipe $n$.

Figs. 8 and 9 show how gas may be produced from oil, creosote, or other such liquefiable substances, for the purpose of generating heat to raise steam or for other purposes. 1 is a tall cup placed in a cylinder, 2, on a false bottom, 3, contained therein. 4 is the inlet-pipe for oil passing down to near the bottom of cup 1, and 5 is the outlet-pipe for conveying the gas to the burners. The cylinder containing the cup is placed by preference in the front part of an ordinary furnace, and heat applied to it by means of charcoal or coke. After the apparatus is once heated by such means the heat may be maintained by burning in jets part of the gas produced in the apparatus itself, or the heat of the flue can be conveniently used to maintain the apparatus at the necessary heat. The vapor of the oil generated by the heat imparted to the apparatus first rises over the top of the cup, (which, as well as the cylinder, is filled with some or other of the "chemical purifiers;") then descends through the cylinder and becomes converted into gas; then through the false bottom, and escapes by the outlet-pipe to be led where it is required, no gas-holder being necessary. By these means petroleum, creosote, turba, or other oils or liquefiable resins or fuels of any kind may be used, as they are completely and entirely converted into gas without the deposition of naphthaline in the flues, as that substance forms by this process the best part of the gas produced.

By placing this apparatus, as shown in Fig. 9, in connection with a modification of the "redistillation-retorts" before described, the gas, when a larger quantity is required, is made to pass through a longer course of charcoal or other "chemical purifiers," so as to insure the complete changes necessary for the production of a pure gas. When an intense heat is required the gas should be generated in a separate stove or furnace, or the cylinder can be placed in its own small stone furnace, as shown by 6, Fig. 8, being first heated by charcoal or coke; and as that burns away it is substituted by gas given off in a small pipe from the larger discharge gas-pipe, and made to encircle the cylinder, as shown at 7, Fig. 8, the gas being lit up by the burning charcoal or coke, so that when the latter has burned away the gas continues to supply the heat, and can be regulated by a cock, as at 8, Fig. 8.

Figs. 10 and 11 show one arrangement I adopt for burning the gas produced in the apparatus above described, for the purpose of generating steam in the ordinary form of fluid boilers. 5 shows the pipe leading the gas from a generating apparatus such as above described. The said pipe, passing into the brick-work of the furnace, introduces the gas into passages 9 9 9 formed in the brick-work, which communicates with a number of small openings, 10 10 10, in the side walls and bottom of the furnace, as shown, which is to be constructed of fire-brick. Other openings, 11, are also made in the brick-work for the admission of a proper supply of air, which openings should be close to or in connection with those for admitting the gas to the furnace, so as to insure a full and proper supply of air to effect the combustion of the gas; or, instead of openings, as described, for the admission of air, it may enter by a single opening, 12, in front of the furnace.

Figs. 12 and 13 represent an application of the apparatus to a tubular boiler. The generating apparatus $y$ is placed in the fire-box $z$ on the ordinary bars. 13 is a pressure-valve box. The oil is led from a main reservoir to the under side of the said valve-box, which is provided with a pressure-valve, 14. The pipe 15 conveys the oil to the generating apparatus. 16, a stop-cock with regulating-dial, is placed just below the valve-box to regulate the supply of oil. 17 is the pipe for conveying the gas from the generator to the burners 18 in the fire-box. The heated products of combustion must be made to traverse as great a distance in contact with flue or other heating surface as possible by means of serpentine tubes, water-bridges, or other obstructions, in order to prevent their too rapid escape by the chimney. Suitable couplings 19 19 are provided in the oil and gas pipes to allow of the easy detachment of the apparatus from them when requisite for recharging it with "chemical purifiers." Spare apparatus should be ready to attach in its place immediately it is removed. The heat of the furnace will heat the fresh apparatus sufficiently to generate the gas, the oil being admitted as soon as the requisite heat is attained.

Fig. 14 represents a form of cupola for melting iron or other metal or ores, adapted so as to be heated by the gas generated from oil, in the manner above described. The gas is admitted from the gas-forming apparatus by the pipe 5 into the pier 6, formed of hollow brick-work, the lower portion of which is either clayed over, as shown, or built so as to allow the passage of the gas up its center, but not to allow it to escape laterally until it arrives at the upper part of the pier at 7, where the spaces in the brick-work, being open, allow the gas to flow out into the annular space 8. Blasts of air are introduced at various points round the said annular space 8 opposite to the perforations through which the gas passes; or air may be admitted or forced through a number of openings in the brick-work similarly to the gas-openings. Upon the pier 6 is formed the core 9, composed of fire-brick. This core, being enlarged at the bottom, as shown, and placed about the level of the bosh of the cupola, narrows the opening 10 round it to about two inches at the neck thereof. The core is supported above, as shown, and weighted by brick-work or otherwise to prevent the possibility of its rising in the melted metal. The ore or metal to be melted is supported by the projecting parts of the core and boshes, and the burning gas passing up through the narrow opening 10 melts the metal, which drops down clear of the gas-openings into the chamber 8 below, whence it is tapped in the usual manner. The throat of the cupola is contracted with fire bricks, as shown, as the use of gas does not require so large openings for the escape of the products of combustion as ordinary fuel does. The arch of brick-work so formed also reverberates the heat downward onto the metal to be fuzed.

The distilling-retort I have above described, and especially referred to in Figs. 4 and 5, is well adapted for the manufacture of charcoal for gunpowder and other purposes, or for use in the "redistillation-retorts," as all the woods so used will yield, in addition to the charcoal, a large supply of gas, which the "redistillation-retorts" will purify, as before described in reference to sawdust, the wood-tar yielding a heavy and good lighting-gas, which qualifies the inferior gases arising from the decomposition of the acetic acid, carbonic acid, and water which distill over with it. In cases where sawdust is scarce the dried sediment of sewerage or other soft and light material may be employed, or coal can be used with the chalk or lime only; but in that case the retort should not be so full.

For the purpose of purifying mineral oils, I distill them from or through charcoal, and employ a safety apparatus, shown at Figs. 15, 16, and 17. To avoid explosions in performing this operation I employ pressure-valves, so that only a certain quantity can flow into the distilling apparatus at one time; but it flows in as fast as it distills out, and, should an explosion occur, that part only could explode which is subjected to heat. In the figure, 1 is the sand-bath; 2, the still, containing the charcoal, which is held down by suitable perforated frames, not shown. 3 is a large valve fitting the opening of said still; 4, the hood or cover; 5, a pipe to convey the gaseous result of an explosion into a gas-holder, not shown; 6, the throat of the still, narrowing to a pipe, 7, to convey the distilled oil to the cooling-chamber; 8, a slide-valve, connected to large valve 3, which allows the distilled oil to pass by the narrow slit 9 in it to the throat 6 when the still is working properly; but if an explosion takes place the slide-valve is raised with the large valve and the throat 6 is closed to the still, and the gases generated by the explosion pass off into the pipe 5 leading to the gas-holder. The large valve then closes, and the oil projected above it by the explosion can be allowed to run back into the still by lifting the valve by means of the wire and chain 10. 11 is the reservoir of crude oil; and 12, the pipe leading oil from it to the still 2. A valve, 13, in the said pipe is weighted so as just to balance the column of oil between it and the reservoir, so that as the oil in the still is vaporized the valve 13 allows more to enter from supply-pipe. 14 is a pipe, furnished with a small valve, 15, to allow any gases that may escape into pipe 7 to pass from thence into pipe 5.

If desired the still may be heated by the combustion of the waste gases escaping into the gas-holder.

When producing gas from coal in ordinary retorts the said coal may be mixed with chalk and sawdust or other light gas-producing material, by which means the "chemical purifiers" in the "redistillation-retorts" will not require charging so frequently. The retort may also be charged much fuller than when coal only is used. If the quantity of chalk, lime, or other alkali be insufficient in quantity, a sulphuret of carbon is liable to be formed and deposited in the siphon.

Having now described the nature of my said invention, and the manner in which the same is or may be carried into effect, I would have it understood that I am aware it has been attempted to use chalk and lime mixed with coal in an ordinary retort to produce gas, and also that attempts have been made to use charcoal and lime as purifying agents; but the methods heretofore tried for employing those substances have been imperfect. By the use of the various methods and apparatus I have above described I am enabled to employ these and other like substances so as to produce a much more perfect result than has heretofore been obtained; and

What I claim as my invention is—

1. The method of purifying gas produced from coal or other substances in ordinary retorts by passing it through a series of chambers containing one or more of the chemical purifiers, as hereinbefore described.

2. The method of distilling and purifying gas from coal, or from coal and the other materials described, either in a retort connected with a series of "redistillation-retorts," or in one retort arranged to act both as a distilling-retort and as a "redistillation-retort," as hereinbefore described.

3. The vertical "redistillation-retorts" for purifying coal or other gas, constructed, arranged, and applied substantially in the manner hereinbefore shown and described.

4. The improved retort for distilling lighting or heating gas, or for preparing the charcoal for use in the "redistillation-retorts," or for other purposes, constructed, arranged, and applied substantially as hereinbefore shown and described.

5. The method of and apparatus for converting liquid fuel into gas before burning it, so as to render it suitable for heating purposes, as hereinbefore shown and described.

6. The various methods of and apparatus for applying the gas produced from liquid or other fuel to heating purposes, substantially as described and shown in Figs. 10, 11, 12, 13, and 14 of the drawings.

7. The method of and apparatus described for distilling mineral oil or liquefiable fuel at or below 325° Fahrenheit, so as to render the substance so distilled non-explosive below 300° Fahrenheit.

In testimony whereof I have signed my name hereto in the presence of two subscribing witnesses this ninth day of September, one thousand eight hundred and sixty-nine.

GEORGE EVELEIGH.

Witnesses:
  W. H. BECK,
  H. BUSHWELL.